(12) United States Patent  
Otaki et al.

(10) Patent No.: US 10,714,737 B2  
(45) Date of Patent: Jul. 14, 2020

(54) ANODE LAYER AND ALL SOLID LITHIUM BATTERY

(71) Applicant: TOYOTA JIDOSHA KABUSHIKI KAISHA, Toyota-shi, Aichi-ken (JP)

(72) Inventors: Mitsutoshi Otaki, Susono (JP); Norihiro Ose, Susono (JP); Shigenori Hama, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 110 days.

(21) Appl. No.: 15/853,125

(22) Filed: Dec. 22, 2017

(65) Prior Publication Data

US 2018/0212227 A1 Jul. 26, 2018

(30) Foreign Application Priority Data

Jan. 25, 2017 (JP) .................................. 2017-011052

(51) Int. Cl.
*H01M 4/134* (2010.01)
*H01M 4/38* (2006.01)
(Continued)

(52) U.S. Cl.
CPC ........... *H01M 4/134* (2013.01); *H01M 4/386* (2013.01); *H01M 10/0468* (2013.01); *H01M 10/052* (2013.01); *H01M 10/0525* (2013.01); *H01M 10/0562* (2013.01); *H01M 2004/021* (2013.01); *H01M 2004/027* (2013.01); *H01M 2300/0068* (2013.01); *Y02E 60/122* (2013.01); *Y02T 10/7011* (2013.01)

(58) Field of Classification Search
CPC ........... H01M 10/0468; H01M 10/052; H01M 10/0525; H01M 10/0562; H01M 2004/021; H01M 2004/027; H01M 2300/0068; H01M 4/134; H01M 4/386
See application file for complete search history.

(56) References Cited

U.S. PATENT DOCUMENTS

| 2012/0070738 | A1  | 3/2012 | Yoshida |            |
|--------------|-----|--------|---------|------------|
| 2013/0252089 | A1* | 9/2013 | Kuriki  | H01G 11/04 |
|              |     |        |         | 429/211    |

(Continued)

FOREIGN PATENT DOCUMENTS

| JP | 2003-109590 A | 4/2003 |
| JP | 2013-069416   | 4/2013 |

(Continued)

OTHER PUBLICATIONS

J. Zhang, C. Zhang, S. Wu, X. Zhang, C. Li, C. Xue, B. Cheng. High-Columbic-Efficiency Lithium Battery Based on Silicon Particle Materials, Nanoscale Research Letters (2015) 10:395.*

(Continued)

*Primary Examiner* — Carlos Barcena  
(74) *Attorney, Agent, or Firm* — Sughrue Mion, PLLC

(57) ABSTRACT

A main object of the present disclosure is to provide an all solid lithium battery with excellent capacity durability. The above object is achieved by providing an anode layer to be used in an all solid lithium battery, the anode layer comprising: a metal particle capable of being alloyed with Li, as an active material; and the metal particle has two kinds or more of crystal orientation in one particle.

5 Claims, 2 Drawing Sheets

(51) Int. Cl.
*H01M 10/04* (2006.01)
*H01M 10/0525* (2010.01)
*H01M 10/052* (2010.01)
*H01M 10/0562* (2010.01)
*H01M 4/02* (2006.01)

(56) References Cited

U.S. PATENT DOCUMENTS

| | | |
|---|---|---|
| 2014/0287317 A1 | 9/2014 | Tiquet et al. |
| 2015/0180076 A1 | 6/2015 | Hasegawa et al. |
| 2015/0236373 A1 | 8/2015 | Ohtomo et al. |
| 2017/0077732 A1 | 3/2017 | Otaki et al. |
| 2017/0092942 A1 | 3/2017 | Fukasawa et al. |
| 2018/0212227 A1 | 7/2018 | Otaki et al. |

FOREIGN PATENT DOCUMENTS

| | | |
|---|---|---|
| JP | 2013-105701 A | 5/2013 |
| JP | 2013-211238 A | 10/2013 |
| JP | 2014-35987 A | 2/2014 |
| JP | 2014-041783 | 3/2014 |
| JP | 2015-501279 A | 1/2015 |
| JP | 2015-118867 A | 6/2015 |
| JP | 2015-156297 | 8/2015 |
| JP | 2016-184495 A | 10/2016 |
| JP | 2017-59534 A | 3/2017 |
| JP | 2018-120735 | 8/2018 |
| WO | 2015/140907 A1 | 9/2015 |

OTHER PUBLICATIONS

Zhang et al., "High-Columbic-Efficiency Lithium Battery Based on Silicon Particle Materials", Nanoscale Research Letters, vol. 10, No. 395, 2015, 5 pages total.

Notice of Allowance dated May 13, 2020, issued by the U.S. Appl. No. 16/377,991

* cited by examiner

Examples 1 to 4

Comparative Examples 1 to 4

ANODE LAYER AND ALL SOLID LITHIUM BATTERY

TECHNICAL FIELD

The present disclosure relates to an all solid lithium battery with excellent capacity durability.

BACKGROUND ART

In accordance with a rapid spread of information relevant apparatus and communication apparatus such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

For example, Patent Literature 1 discloses a lithium ion battery comprising an anode manufactured of an anode mixture having a weight per unit area of 8.5 mg/cm$^2$ or less, and the anode mixture contains an anode active material and a solid electrolyte. Also, Patent Literature 1 discloses that the anode mixture contains an anode active material that includes at least one of silicon, tin, indium, aluminum, and lithium. Patent Literature 2 discloses a method for producing an anode using a Si powder that contains amorphous. Patent Literature 3 discloses a silicon/carbon composite material, consisting of at least one capsule comprising a silicon shell within which there are carbon nano-objects partially or totally covered with silicon, and silicon nano-objects.

CITATION LIST

Patent Literatures

Patent Literature 1: Japanese Patent Application Laid-Open (JP-A) No. 2013-211238
Patent Literature 2: JP-A No. 2016-184495
Patent Literature 3: Japanese Unexamined Patent Application Publication No. 2015-501279

SUMMARY OF DISCLOSURE

Technical Problem

For example, the anode active material described in Patent Literature 1 has large volume change during charge and discharge, and thus the problem lies in the low capacity durability. The present disclosure has been made in view of the above circumstances, and a main object thereof is to provide an anode layer allowing the capacity durability of an all solid lithium battery to be excellent, and to provide the all solid lithium battery.

Solution to Problem

In order to achieve the object, the present disclosure provides an anode layer to be used in an all solid lithium battery, the anode layer comprising: a metal particle capable of being alloyed with Li, as an active material; and the metal particle has two kinds or more of crystal orientation in one particle.

According to the present disclosure, the anode layer comprising the above described metal particle as an active material allows the capacity durability to be excellent when the anode layer is used in an all solid lithium battery.

In the disclosure, the metal particle is preferably a simple substance of Si or a Si alloy.

The present disclosure provides an all solid lithium battery comprising a battery element including an anode layer, a cathode layer, and a solid electrolyte layer formed between the anode layer and the cathode layer, and the anode layer is the above described anode layer.

According to the present disclosure, the battery element including the above described anode layer allows an all solid lithium battery to have excellent capacity durability.

In the disclosure, it is preferable that the all solid lithium battery further comprises a confining member that applies a confining pressure to the thickness direction of the battery element, wherein the confining pressure is in a range of 3 MPa to 20 MPa. The reason therefor is to allow the all solid lithium battery to have excellent capacity durability particularly under a low confining pressure.

In the disclosure, the all solid lithium battery may comprise a plurality of the battery element.

Advantageous Effects of Disclosure

The anode layer of the present disclosure allows an all solid lithium battery to have excellent capacity durability.

DESCRIPTION OF EMBODIMENTS

The anode layer and the all solid lithium battery of the present disclosure are hereinafter described in details.

A. Anode Layer

Figure 1:
FIG. 1 is a schematic cross-sectional view illustrating an example of the anode layer of the present disclosure.
Figure 2:
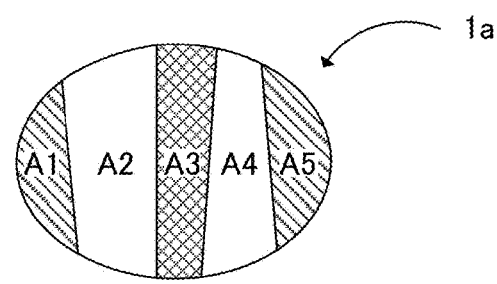
FIG. 2 is a schematic cross-sectional view illustrating an example of the metal particle in the present disclosure.

FIG. 1 is a schematic cross-sectional view illustrating an example of the anode layer of the present disclosure, and FIG. 2 is a schematic cross-sectional view illustrating an example of the metal particle to be used as an anode active material. Anode layer 1 shown in FIG. 1 is used in an all solid lithium battery. Also, anode layer 1 comprises metal particle 1a shown in FIG. 2 as an active material. Metal particle 1a is a metal particle capable of being alloyed with Li, and has two kinds or more of crystal orientation in one particle. In particular, metal particle 1a has the regions colored by two or more colors in one particle (A1 to A5 in FIG. 2) in an EBSD measurement.

According to the present disclosure, the anode layer comprising the above described metal particle as an active material allows the capacity durability to be excellent when the anode layer is used in an all solid lithium battery. Also, according to the present disclosure, the anode layer comprises the above described metal particle as an active material, so that a crack inside the anode layer during charge and discharge may be inhibited, and thus the anode layer may have excellent durability.

As an active material used in an all solid lithium battery, for example, an alloy-type active material such as Si (an alloy-type active material that is a metal capable of being alloyed with Li) has been known. Alloy-type active materials have generally large volume change during charge and discharge, and the problem lies in the low capacity durability.

To solve the problem, the inventors of the present disclosure has focused on the crystallinity of an alloy-type active material, researched therefor, and found out that the capacity durability may be improved by controlling the crystallinity of an alloy-type active material. In particular, they have found out that, in comparison with when using a metal particle having a single crystal orientation (hereinafter referred to as a single crystal particle in some cases), the capacity durability has more improved when using a metal particle having two kinds or more of crystal orientation in one particle (hereinafter referred to as a twin crystal particle in some cases).

The reason therefor is presumed as follows. An alloy-type active material has large volume change during charge and discharge (alloying with Li, and dealloying). Thus, a stress caused by the volume change of the alloy-type active material is generated inside the anode layer, and a "crack" inside the anode layer (such as a breakage of the anode layer and a crack of the active material) due to the stress concentration presumably occurs to degrade the capacity durability.

In the present disclosure, a twin crystal particle is present inside the anode layer, and the twin crystal portion receives the generated stress, so that the stress concentration is presumably moderated. In other words, the stress generated inside the anode layer is released to the twin crystal particle, so that the "crack" inside the anode may be inhibited, and thus, the capacity durability presumably becomes excellent.

On the other hand, for example, when a single crystal particle is used, it is presumed that the single crystal particle may not have a function to moderate the stress generated inside the anode layer. Accordingly, the stress generated inside the anode layer may not be released, a local stress concentration may easily occur, and the "crack" inside the anode layer presumably easily occurs.

Incidentally, in Patent Literature 2, it is described that the capacity durability of a battery is improved by using amorphous Si instead of crystal Si; however, usage of the twin crystal particle is neither disclosed nor suggested.

Now, in a battery using an alloy-type active material, one of the prospected measures to inhibit the decrease in the capacity durability is to control the volume change, in particular, to increase the confining pressure. However, from the viewpoint such as cost and energy density, the confining pressure of a battery is desired to be as low as possible.

The inventors of the present disclosure have found out that the capacity durability of an all solid lithium battery may be excellent by using the above described metal particle, especially even when the battery is in a condition under a low confining pressure (such as approximately 3 MPa to 20 MPa).

The anode layer of the present disclosure is hereinafter described in each constitution.

1. Active Material

The anode layer in the present disclosure comprises a metal particle capable of being alloyed with Li, as an active material. Further, the metal particle has two kinds or more of crystal orientation in one particle.

(1) Metal Particle

The metal particle in the present disclosure features a configuration of having two kinds or more of crystal orientation in one particle.

"The metal particle has two kinds or more of crystal orientation in one particle" means that the mapping image to be obtained by Electron Backscatter Diffraction Pattern (EBSD) measurement may be colored by two or more colors. EBSD measurement is one kind of crystal analysis by SEM (Scanning Electron Microscope).

The specific method for the measurement is as follows.

First, a metal particle is embedded in resin, and the metal particle with the resin is cut to expose the cross section. EBSD measurement is conducted for the obtained cross section at the magnification that allows approximately 5 particles to be included, for example. The obtained diffraction pattern is analyzed to obtain the mapping image by IPF (Inverse Pole Figure) mapping.

Incidentally, the conditions for the measurement are as follows:

Cross Section Production

Apparatus: SM-09010 Cross section Polisher™ from JEOL Ltd.; Ion source: Argon; Acceleration voltage: 5.5 kV

SEM

Apparatus: JSM-7000F Field Emission Scanning Electron Microscope from JEOL Ltd.; Acceleration voltage: 7.5 kV

EBSD

Apparatus: OIM™ Crystal Orientation Analysis Device from TSL Solutions Co., Ltd.; Acceleration voltage: 15 kV.

Incidentally, in the cross section production, for example, Apparatus: IM-4000 from Hitachi High-Technologies Corporation; Ion source: Ar; Acceleration voltage: 5.0 kV, are the conditions that may be used instead of the above described conditions.

The metal particle in the present disclosure has two kinds or more of crystal orientation in one particle.

The number of crystal orientation that the metal particle has may be two kinds or more; for example, it may be three kinds or more, and may be four kinds or more. Also, the upper limit of the number of the crystal orientation is not limited; for example, it may be ten kinds or less, may be nine kinds or less, and may be seven kinds or less.

The number of the crystal orientation may be measured from, in the map image obtained from EBSD measurement, the number of regions separated by color and the difference of the colors. For example, as shown in FIG. 2, the number of regions separated by color in metal particle $1a$ (one particle) is five ($A1$ to $A5$), and if the regions are colored by three colors, the number of the crystal orientation is three kinds.

In the cross-section of the metal particle, among the two kinds or more of the crystal orientation included in one particle, when the area of the crystal orientation with the smallest area is regarded as $S_{Min}$ and the whole area of one particle is regarded as $S_{tot}$, the rate of $S_{Min}/S_{tot}$ is, for example, 1% or more, preferably 3% or more, and preferably 10% or more. Incidentally, the single crystal and the twin crystal are the series that greatly differ from each other in reality; thus, even if the rate of $S_{Min}/S_{tot}$ is small, the judgement is presumably possible.

Examples of the metal particle may include a simple substance or an alloy including at least one kind of metal elements of a Si element, a Sn element, an In element, and an Al element. The metal particle is preferably a simple substance of Si or a Si alloy, and more preferably a simple substance of Si. If the metal particle is a Si alloy, the proportion of Si elements in the Si alloy may be, for example, 50 mol % or more, may be 70 mol % or more, and may be 90 mol % or more. Also, the proportion of Si elements in a simple substance of Si is usually 100 mol %.

The average particle size ($D_{50}$) of the metal particle is, for example, in a range of 10 nm to 50 µm, and preferably in a range of 100 nm to 20 µm.

Examples of the method for preparing the metal particle may include a method in which a metal particle with single crystal is mechanically crushed so as to obtain a twin crystal particle. For example, a shearing force is applied to the metal particle with a single crystal so as to mechanically crush the metal particle, and as the result, the crystallinity is presumably decreased and thus a twin crystal particle may be obtained. Also, examples of the method for preparing the metal particle may include a method in which the speed of the crystal growth is changed in the middle to obtain a twin crystal particle.

(2) Active Material

The anode layer comprises at least the metal particle as an active material. The anode layer may, as an active material, comprise only the metal particle, and may further comprise additional active material other than the metal particle. Example of the additional active material may include an amorphous capable of being alloyed with Li, and a single crystal capable of being alloyed with Li. The proportion of the metal particle (a metal particle that has two or more kinds of crystal orientation in one particle) with respect to all the active material is, for example, preferably 50 mol % or more, preferably 70 mol % or more, and preferably 90 mol % or more. Also, the proportion of the single crystal particle with respect to all the active material is, for example, preferably 10% or less, preferably 5% or less, and preferably 2% or less.

The proportion of the active material in the anode layer is, for example, 30 weight % or more, and preferably 50 weight % or more. Also, the proportion of the anode active material is, for example, 99 weight % or less, may be 85 weight % or less, and may be 80 weight % or less.

(3) Anode Layer

The anode layer in the present disclosure usually contains the above described active material, and may further contain at least one of a solid electrolyte material, conductive additive, and a binder as required.

Examples of the solid electrolyte material may include an inorganic solid electrolyte material such as a sulfide solid electrolyte material. Examples of the sulfide solid electrolyte material may include $Li_2S$—$P_2S_5$, $Li_2S$—$P_2S_5$—$Li_3PO_4$, $LiI$—$P_2S_5$—$Li_3PO_4$, $Li_2S$—$P_2S_5$—$LiI$, $Li_2S$—$P_2S_5$—$LiI$—$LiBr$, $Li_2S$—$P_2S_5$—$Li_2O$, $Li_2S$—$P_2S_5$—$Li_2O$—$LiI$, $Li_2S$—$P_2O_5$, $LiI$—$Li_2S$—$P_2O_5$, $Li_2S$—$SiS_2$, $Li_2S$—$SiS_2$—$LiI$, $Li_2S$—$SiS_2$—$LiI$—$LiBr$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (provided that m and n are positive numbers; Z is one of Ge, Zn, and Ga), $Li_2S$—$GeS_2$, $Li_2S$—$SiS_2$—$Li_3PO_4$, and $Li_2S$—$SiS_2$-$Li_xMO_y$ (provided that x and y are positive numbers; M is one of P, Si, Ge, B, Al, Ga, and In). Incidentally, the description "$Li_2S$—$P_2S_5$" refers to a sulfide solid electrolyte material comprising a raw material composition that contains $Li_2S$ and $P_2S_5$, and the same applies for the others.

In particular, a sulfide solid electrolyte material preferably comprises an ion conductor that contains Li, A (A is at least one kind of P, Si, Ge, Al, and B), and S. Further, the ion conductor preferably has an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to allow a sulfide solid electrolyte to have high chemical stability. The proportion of the anion structure of an ortho composition with respect to all the anion structures in the ion conductor is, preferably 70 mol % or more, and more preferably 90 mol % or more. The proportion of the anion structure of an ortho composition may be determined by methods such as a Raman spectroscopy, NMR, and XPS.

The sulfide solid electrolyte material may contain lithium halide in addition to the ion conductor. Examples of the lithium halide may include LiF, LiCl, LiBr, and LiI; among them, LiCl, LiBr, and LiI are preferable. The proportion of LiX (X=I, Cl, and Br) in the sulfide solid electrolyte material is, for example, in a range of 5 mol % to 30 mol %, and preferably in a range of 15 mol % to 25 mol %. The proportion of LiX refers to the total proportion of LiX contained in the sulfide solid electrolyte.

The sulfide solid electrolyte material may be a crystalline material, and may be an amorphous material. Also, the sulfide solid electrolyte may be glass, and may be crystallized glass (glass ceramics). Examples of the shape of the sulfide solid electrolyte material may include a granular shape.

The weight ratio of the active material and the solid electrolyte material (active material/solid electrolyte material) in the anode layer is, for example, desirably in a range of 30/70 to 85/15, and may be in a range of 40/60 to 80/20.

Examples of the conductive additive may include carbon materials such as acetylene black (AB), Ketjen black (KB), carbon fiber, carbon nanotube (CNT), and carbon nanofiber (CNF). In more particular, vapor-grown carbon fiber (VGCF) may be used as the carbon material. Also, for example, VGCF from SHOWA DENKO K.K may be used as the vapor-grown carbon fiber.

Also, examples of the binder may include rubber-based binders such as butylene rubber (BR) and styrene butadiene rubber (SBR), and fluorine-based binders such as polyvinylidene fluoride (PVDF). Also, the thickness of the anode layer is, for example, desirably in a range of 1 µm to 100 µm, and preferably in a range of 30 µm to 100 µm. The anode layer of the present disclosure is used in an all solid lithium battery.

B. All Solid Lithium Battery

Figure 3:
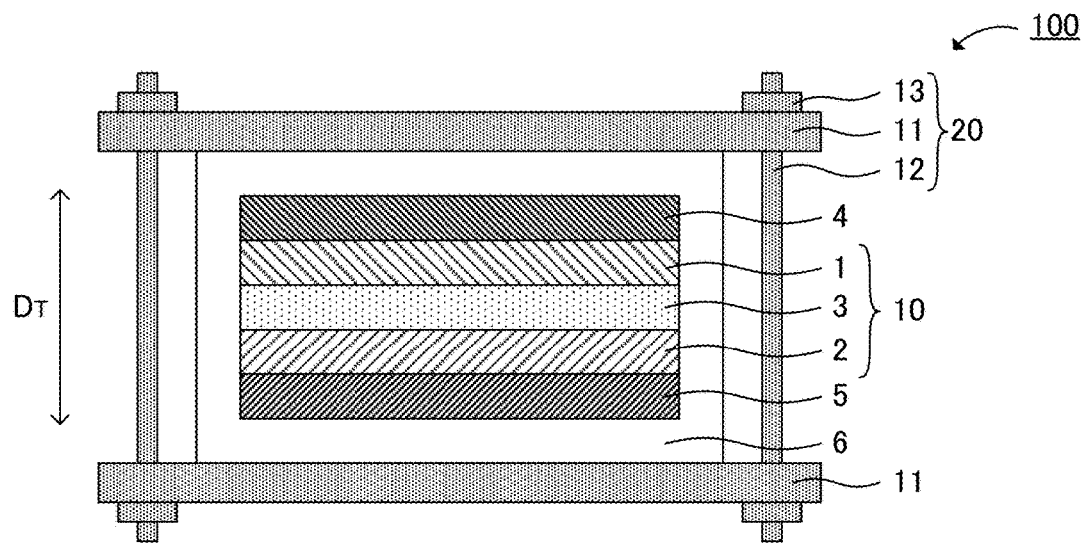
FIG. 3 is a schematic cross-sectional view illustrating an example of the all solid lithium battery of the present disclosure.

FIG. 3 is a schematic cross-sectional view illustrating an example of the all solid lithium battery of the present disclosure. All solid lithium battery 100 shown in FIG. 3 comprises battery element 10 including anode layer 1, cathode layer 2, and solid electrolyte layer 3 formed between anode layer 1 and cathode layer 2. All solid lithium battery 100 further comprises anode current collector 4 for collecting currents of anode layer 1, cathode current collector 5 for collecting currents of cathode layer 2, and battery case 6 for storing these members. In the present disclosure, anode layer 1 is the above described "A. Anode layer".

In the present disclosure, all solid lithium battery 100 may further comprise confining member 20. Confining member 20 is a member that applies a confining pressure to battery element 10 in the thickness direction $D_T$. In particular, confining member 20 comprises two plate parts 11 disposed on the both surfaces of battery element 10, and pillar parts 12 that link the two plate parts 11, and controlling part 13 that is connected to pillar parts 12 to control the confining pressure by a structure such as a screw structure. In the present disclosure, a specific confining pressure is applied to battery element 10 by confining member 20.

According to the present disclosure, the battery element includes the above described anode layer, so as to allow an all solid lithium battery to have an excellent capacity durability.

The all solid lithium battery of the present disclosure is hereinafter described in each constitution.

1. Battery Element

The battery element in the present disclosure includes an anode layer, a cathode layer, and a solid electrolyte layer formed between the anode layer and the cathode layer.

(1) Anode Layer

The anode layer in the present disclosure may be in the same contents as those described in "A. Anode layer" above; thus, the description herein is omitted.

(2) Cathode Layer

The cathode layer in the present disclosure is a layer that contains at least a cathode active material, and may further contain at least one of a solid electrolyte material, a conductive additive, a binder, and a thickener as required. Examples of the cathode active material may include oxide active materials.

Examples of the oxide active material may include rock salt bed type active materials such as $LiCoO_2$, $LiMnO_2$, $LiNiO_2$, $LiVO_2$, and $LiNi_{1/3}Co_{1/3}Mn_{1/3}O_2$, spinel type active materials such as $LiMn_2O_4$, $Li_4Ti_5O_{12}$, and $Li(Ni_{0.5}Mn_{1.5})O_4$, and olivine type active materials such as $LiFePO_4$, $LiMnPO_4$, $LiNiPO_4$, and $LiCoPO_4$. Also, as the oxide active material, materials such as a LiMn-spinel active material represented by $Li_{1+x}Mn_{2-x-y}M_yO_4$ (M is at least one kind of Al, Mg, Co, Fe, Ni, and Zn; 0<x+y<2), and lithium titanate may be used.

Also, a coating layer including a Li ion conductive oxide is preferably formed on the surface of the cathode active material. The reason therefor is to inhibit the reaction of the cathode active material with the solid electrolyte material. Examples of the Li ion conductive oxide may include $LiNbO_3$, $Li_4Ti_5O_{12}$, and $Li_3PO_4$. The thickness of the coating layer is, for example, in a range of 0.1 nm to 100 nm, and preferably in a range of 1 nm to 20 nm. The coverage of the coating layer on the surface of the cathode active material is, for example, 50% or more, and preferably 80% or more.

The solid electrolyte material, the conductive additive and the binder to be used for the cathode active material are the same as in the case for the above described anode layer. The weight ratio of the active material and the solid electrolyte material (active material/solid electrolyte material) is, for example, desirably in a range of 30/70 to 85/15, and may be in a range of 50/50 to 80/20. Also, the thickness of the cathode layer is, for example, desirably in a range of 1 μm to 100 μm, and preferably in a range of 3 μm to 100 μm.

(3) Solid Electrolyte Layer

The solid electrolyte layer in the present disclosure is a layer formed between the cathode layer and the anode layer. Also, the solid electrolyte layer is a layer that contains at least a solid electrolyte material, and may further contain a binder as required.

The solid electrolyte material and the binder to be used for the solid electrolyte layer are the same as in the case for the above described anode layer. Also, the content of the solid electrolyte material in the solid electrolyte layer is, for example, in a range of 10 weight % to 100 weight %, and preferably in a range of 50 weight % to 100 weight %. Also, the thickness of the solid electrolyte layer is, for example, in a range of 0.1 μm to 300 μm, and preferably in a range of 0.1 μm to 100 μm.

2. Confining Member

The confining member in the present disclosure is a member that applies a confining pressure to the thickness direction of the battery element. The constitution of the confining member is not limited, and for example, as shown in above described FIG. 3, a confining member including a plate part, a pillar part, and a controlling part, may be exemplified. Incidentally, the confining member may be subjected to an insulating treatment required to prevent short circuit of the cathode and anode.

The confining pressure to be applied to the all solid lithium battery by the confining member may be appropriately selected in accordance with the kind of the battery, and thus is not limited. The confining pressure may be, for example, 3 MPa or more, and may be 5 MPa or more. Also, the confining pressure may be, for example, 100 MPa or less, may be 50 MPa or less, may be 45 MPa or less, and may be 20 MPa or less. In the present disclosure, the confining pressure is preferably in a range of 3 MPa to 20 MPa among the above described pressure. The present disclosure allows an all solid lithium battery to have excellent capacity durability especially even under a low confining pressure.

3. Other Constitution

The all solid lithium battery of the present disclosure usually comprises a cathode current collector for collecting currents of the cathode layer and an anode current collector for collecting currents of the anode layer. Examples of the materials for the cathode current collector may include SUS, Ni, Cr, Au, Pt, Al, Fe, Ti, and Zn. A coating layer of a substance such as Ni, Cr, and C may be formed on the surface of the cathode current collector. The coating layer may be, for example, a plated layer, and may be an overlayer. On the other hand, examples of the materials for the anode current collector may include Cu and a Cu alloy. A coating layer of a substance such as Ni, Cr, and C may be formed on the surface of the anode current collector. The coating layer may be, for example, a plated layer, and may be an overlayer. Also, as a battery case, for example, a battery case made of SUS may be used. Incidentally, as shown in FIG. 3, confining member 20 preferably confines battery element 10 from outside battery case 6.

4. All Solid Lithium Battery

The all solid lithium battery of the present disclosure may be a primary battery and may be a secondary battery, but preferably a secondary battery among them so as to be repeatedly charged and discharged, and be useful as a car-mounted battery, for example. Incidentally, the primary battery includes the use of a secondary battery as a primary battery (use for the purpose of discharge just once after charge). Examples of the shape of the all solid lithium battery may include a coin shape, a laminate shape, a cylindrical shape, and a square shape.

The all solid lithium battery may comprise one battery element, and may comprise a plurality of the battery elements. In the latter case, a plurality of the battery elements are preferably stacked in the thickness direction. The plurality of the battery elements may be connected in parallel, and may be connected in series. In the latter case, the battery corresponds to a so-called bipolar-type battery, and an intermediate current collector is usually formed in between two battery elements adjacent to each other.

Incidentally, the present disclosure is not limited to the embodiments. The embodiments are exemplification, and any other variations are intended to be included in the present disclosure if they have substantially the same constitution as the technical idea described in the claim of the present disclosure and offer similar operation and effect thereto.

EXAMPLES

The present disclosure is hereinafter described in more details with reference to Examples.

Example 1

Preparation of Metal Particle

Si particles (Supreme microncut Supreme20) of which average particle size was intended to be 20 μm was ordered to Elkem.

Figure 4A:
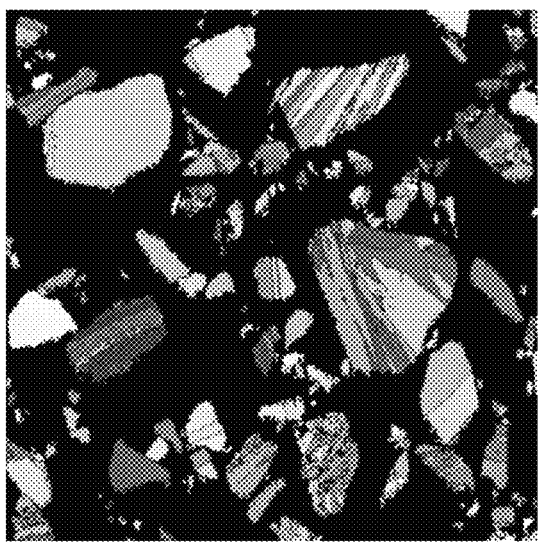
FIGS. 4A and 4B are the results of an EBSD measurement for the Si particles (anode active materials) in Examples 1 to 4 and Comparative Examples 1 to 4.

The Si particle produced was checked by the EBSD measurement described in the section "1. Active material (1) Metal particle" above; as the result, it was confirmed that the Si particle (metal particle) had two kinds to seven kinds of crystal orientations in one particle. The result is shown in FIG. 4A.

The proportion of the single crystal particle in the entire Si particles used in Example 1 was 2% or less; for example, in the EBSD measurement, one single crystal particle may be observed out of 50 Si particles in some cases.

Production of Anode Layer

Butyl butyrate, a butyl butyrate solution containing a PVDF-based binder of 5 weight %, an anode active material (metal particle), a sulfide solid electrolyte material ($Li_2S$—$P_2S_5$-based glass ceramics), and a conductive additive (VGCF) were added to a container made of polypropylene (PP) and stirred by an ultrasonic dispersion apparatus (UH-50 from SMT Corporation) for 30 seconds. After that, the stirred material was shaken by a shaker (TTM-1 from SIBATA SCIENTIFIC TECHNOLOGY LTD.) for 3 minutes. Thereby, anode slurry was obtained.

The obtained anode slurry was pasted on an anode current collector (a Cu foil) by a blade method using an applicator, and then dried on a hot plate at 100° C. for 30 minutes. An anode layer and an anode current collector were obtained in the above manner.

Production of Cathode Layer

Butyl butyrate, a butyl butyrate solution containing a PVDF-based binder of 5 weight %, a cathode active material ($LiCo_{1/3}Ni_{1/3}Mn_{1/3}O_2$; average particle size $D_{50}$=6 μm), a sulfide solid electrolyte material ($Li_2S$—$P_2S_5$-based glass ceramics), and a conductive additive (VGCF) were added to a container made of polypropylene (PP) and stirred by an ultrasonic dispersion apparatus (UH-50 from SMT Corporation) for 30 seconds. After that, the stirred material was shaken by a shaker (TTM-1 from SIBATA SCIENTIFIC TECHNOLOGY LTD.) for 3 minutes. Thereby, cathode slurry was obtained.

The obtained cathode slurry was pasted on a cathode current collector (an Al foil from SHOWA DENKO K.K) by a blade method using an applicator, and then dried on a hot plate at 100° C. for 30 minutes. A cathode layer and a cathode current collector were obtained in the above manner.

Production of Solid Electrolyte Layer

Heptane, a heptane solution containing a butylene rubber (BR)-based binder of 5 weight %, and a sulfide solid electrolyte material ($Li_2S$—$P_2S_5$-based glass ceramics) were added to a container made of polypropylene (PP) and stirred by an ultrasonic dispersion apparatus (UH-50 from SMT Corporation) for 30 seconds. After that, the stirred material was shaken by a shaker (TTM-1 from SIBATA SCIENTIFIC TECHNOLOGY LTD.) for 30 minutes. Thereby, solid electrolyte slurry was obtained.

The obtained slurry was pasted on a base material (an Al foil) by a blade method using an applicator, and then dried on a hot plate at 100° C. for 30 minutes. A base material having a solid electrolyte layer on its surface was obtained in the above manner.

Production of Evaluation Battery

The solid electrolyte layer was stacked on the cathode layer so that the solid electrolyte layer contacted the cathode layer, and then pressed at 1 ton/cm². Next, the Al foil, which was used as the base material for the solid electrolyte layer, was peeled off, and a stacked body of the solid electrolyte layer and the cathode layer was produced. The anode layer was stacked on the solid electrolyte layer side of the stacked body, and pressed at 6 ton/cm² to obtain a cell. Incidentally, the diameter of the anode layer was made to be larger than the diameter of the cathode layer.

The produced cell was confined by a confining jig at 15 MPa to obtain an evaluation battery.

Comparative Example 1

Figure 4B:
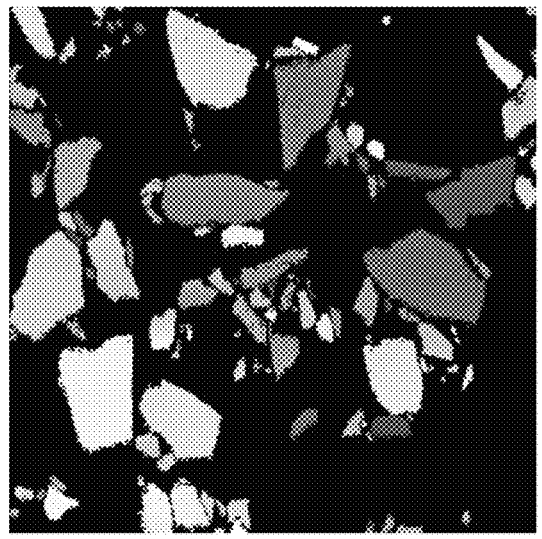

An evaluation battery was obtained in the same manner as in Example 1, except that Si particles (SIE23PB from Kojundo Chemical Laboratory Co., Ltd.) were used as the anode active material. The Si particle used in Comparative Example 1 was checked by the EBSD measurement, and it was confirmed that the Si particle had one kind of crystal orientation. The result is shown in FIG. 4B.

Examples 2 to 4

An evaluation battery was obtained in the same manner as in Example 1, except that the confining pressure of the cell was changed to 5 MPa (Example 2), 20 MPa (Example 3), and 45 MPa (Example 4).

Comparative Examples 2 to 4

An evaluation battery was obtained in the same manner as in Comparative Example 1, except that the confining pressure of the cell was changed to 3 MPa (Comparative Example 2), 30 MPa (Comparative Example 3), and 45 MPa (Comparative Example 4).

[Evaluation]

Following (1) to (4) treatments were conducted for the evaluation battery respectively:

(1) Activation

The battery was charged in constant current/constant voltage to 4.55 V (the final current: 1/100 C) at the hourly rate of 10 (1/10 C), and thereafter discharged in constant current/constant voltage to 2.5 V, to activate the battery;

(2) Initial Discharge Capacity Measurement

The battery was charged in constant current/constant voltage to 4.35 V, discharged in constant current/constant voltage to 3.0 V, and the initial discharge capacity was measured;

(3) Durability Test

The battery was charged to 4.08 V, and then charge was changed to discharge per second, and the battery was discharged in an amount equivalent to SOC 61.6% so that it became the discharge capacity> the charge capacity. After the discharge, the battery was charged again to 4.08 V. This charge and discharge treatment was repeated for 28 days;

(4) Discharge Capacity Measurement after Durability Test

Charge and discharged were conducted under the same conditions as in (2), and the discharge capacity after the durability test was measured.

The value of discharge capacity after the durability test with respect to the initial discharge capacity was calculated as the capacity durability (%). The result is shown in Table 1 and FIG. 5. Incidentally, the capacity durability in Table 1 is a relative value when the capacity durability in Comparative Example 1 is regarded as 100%.

TABLE 1

| | Number of crystal orientation in one particle | Confining pressure (Mpa) | Capacity durability (%) |
|---|---|---|---|
| Comparative Example 1 | 1 | 15 | 100 |
| Comparative Example 2 | 1 | 3 | 64 |
| Comparative Example 3 | 1 | 30 | 121 |
| Comparative Example 4 | 1 | 45 | 124 |
| Example 1 | 2~7 | 15 | 121 |
| Example 2 | 2~7 | 5 | 90 |
| Example 3 | 2~7 | 20 | 131 |
| Example 4 | 2~7 | 45 | 128 |

Figure 5:
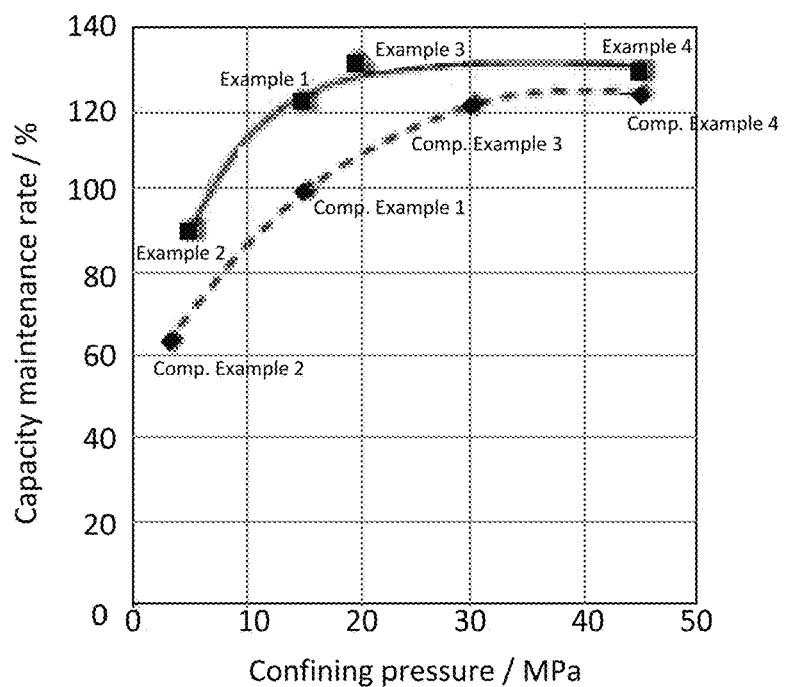
FIG. 5 is a graph showing the relation between the confining pressure and the capacity durability in the evaluation battery of Examples 1 to 4 and Comparative Examples 1 to 4.

As shown in FIG. 5, from the result of Examples 1 to 4 and Comparative Examples 1 to 4, when the confining pressure was fixed (when fixed on the horizontal axis), it was confirmed that the capacity durability was improved more when the twin crystal particle, of which crystal orientation was two kinds or more, was used, than when the single crystal particle, of which crystal orientation was one kind, was used.

Also, when the confining pressure was in a range of 3 MPa to 20 MPa (equivalent to 1 N·m or less), the effect of keeping the capacity durability was recognized to be higher in Examples than in Comparative Examples. Thus, from Examples, it was suggested that the anode layer of the present disclosure allowed the capacity durability to be excellent especially under a low confining pressure.

REFERENCE SIGNS LIST

1 . . . anode layer
2 . . . cathode layer
3 . . . solid electrolyte layer
4 . . . anode current collector
5 . . . cathode current collector
10 . . . battery element
20 . . . confining member
100 . . . all solid lithium battery

What is claimed is:

1. An all solid lithium battery comprising a battery element including an anode layer, a cathode layer, and a solid electrolyte layer formed between the anode layer and the cathode layer, the anode layer comprising:

a metal particle capable of being alloyed with Li, as an active material;

wherein the metal particle is a twin crystal particle having two kinds or more of crystal orientation in one particle.

2. The all solid lithium battery according to claim 1, wherein the metal particle is a simple substance of Si or a Si alloy.

3. The all solid lithium battery according to claim 1, wherein, in a map image obtained from an EBSD measurement, the metal particle has a number of regions separated by two colors to seven colors.

4. The all solid lithium battery according to claim 1, further comprising a confining member that applies a confining pressure to the thickness direction of the battery element, wherein the confining pressure is in a range of 3 MPa to 20 MPa.

5. The all solid lithium battery according to claim 1, comprising a plurality of the battery element.

* * * * *